United States Patent Office 3,311,464
Patented Mar. 28, 1967

3,311,464
ALUMINUM-CONTAINING MOLDING POWDER
AND PROCESS FOR MAKING
Richard N. Blomberg, Wilmington, Del., assignor to E. I. du Pont de Nemours and Company, Wilmington, Del., a corporation of Delaware
No Drawing. Filed Feb. 25, 1964, Ser. No. 347,118
4 Claims. (Cl. 75—.5)

This invention is concerned with a molding powder useful for the preparation of refractory shapes.

It is known to use the Thermit reaction between aluminum and a reducible metal oxide to prepare ceramic-metallic compositions. The nature of this reaction is such that it is difficult to control the dimensions of the articles produced thereby within close limits. Another drawback of such proposed processes is the fact they generally require the aluminum to be in the relatively expensive form of powder.

One object of the invention is to provide a composition containing aluminum which can be converted by a readily controlled reaction to a product containing alumina.

Another object is to provide a process for the preparation of aluminum-containing molding powder.

The molding powder of the invention is prepared by heating with agitation a mixture of molten aluminum and a metal oxide selected from the group consisting of zinc and titanium oxides, the ratio of gram atoms of aluminum to moles of the oxide being from about 11:1 to 1:1, and preferably between 8:1 and 4:1, at a temperature of from about 850° to 1100° C. until the mixture has characteristics of a powder. The molding powder consists essentially of particles of aluminum that are at least partially coated with zinc or titanium oxide and after classification to eliminate aggregates, is characterized by a particle size distribution wherein at least 60% (preferably 70%) passes a 30-mesh screen and at least 35% (preferably 50%) passes a 60-mesh screen.

Shaped articles are prepared from the molding powder in a process comprising molding the powder into a shaped object, and firing the shaped object in an oxygen-containing atmosphere at a temperature of between about 1000° C. and the melting point of the object. The powder prior to molding should pass a 20-mesh screen. It is preferred that the shaped object have one dimension that is no greater than about 0.125 inch to insure homogeneity.

In the preparation of the molding powder the ratio of the gram atoms of aluminum to the moles of metal oxide will range from 1:1 to 11:1.

Pure aluminum or alloys of aluminum with other metals such as magnesium, manganese, or copper, in which alloys aluminum constitutes the major proportion, may be used.

The metal oxide should be finely powdered, for example, from −100 to −325 mesh to provide for good dispersion.

The preferred manner of combining the aluminum and the metal oxide is by adding the metal oxide with stirring to the molten aluminum. The temperature of the aluminum should not be more than about 1100° C. in order to prevent a premature reaction. If desired, the mixture can be made by heating particulate aluminum and metal oxide, or by mixing a stream of molten aluminum and the metal oxide.

Stirring or other means of agitation should be adequate to provide an intimate dispersion of the molten aluminum and the metal oxide. In general, the reaction rate can be controlled by the intensity of mixing for batch operations.

The type of heating and the design for the furnace used is not critical. The use of materials which are not readily attacked by molten aluminum is apparent. Alumina is satisfactory but fused quartz is not. Proper control of the temperature and provision for mixing are the only requirements. Localized heating should be avoided. Satisfactory apparatus design will be apparent to those skilled in the art.

The mixture of aluminum and metal oxide should be heated between 850° and 1100° C. with stirring or other form of agitation. The degree of dispersion of the aluminum in the molding powder is dependent on the temperature, reaction time, composition and proportions of the reactants and the degree of homogeneity of the mixture at the start. Reaction times of from 5 to 20 minutes at 950° C. are typical, being largely a function of mixing intensity. The reaction is terminated when the mix converts to a powder, thus indicating that the aluminum is completely dispersed.

Generally the appearance of the powdered state of the reactants is accompanied by an abrupt rise in the temperature of the reactants. This can be used as a guide to control the reaction. In the case of zinc oxide, zinc starts to distill at this point. The heat source is then removed and generally the reaction mixture covered to prevent oxidation of the aluminum by air or the formation of nitrides.

The cooled reaction product is classified by conventional means to the desired particle size. Powder passing a 16-mesh screen in yields of from 89 to 96% can usually be obtained without any grinding. The usual comminution steps as ball milling, hammermilling, grinding, etc., can be employed on oversize particles to increase the yield but this is generally not required.

The composition of the molding powder will be essentially aluminum particles having zinc or titanium oxide adhered or bonded thereto in proportions corresponding to the concentration of reactants. The aluminum is dispersed substantially uniformly throughout the composition. Depending on the time and temperature of reaction, some of the aluminum is oxidized to alumina. In general, the latter will amount to from 0 to about 25% of the total aluminum and alumina. The ratio of gram atoms of total aluminum (both elemental and combined) to the moles of metal oxide in the molding powder will range from 1:1 to 11:1. The reaction referred to in the preparation of the molding powder may be a surface phenomenon in which aluminum is dispersed as fine particles within the metal oxide which forms an adherent coating, or there may be a measurable oxidation of aluminum with or without a corresponding reduction of the metal oxide.

The powder is shaped as by pressing or rolling to the desired shape having a thickness preferably no greater than about 0.125 inch. The use of thicker sections may result in soft centers. Molding aids and green binding agents of the types known in the art can be used if desired.

The molded shape is fired to a temperature of between 1000° C. and below the melting point of the shape. The range of 1000 to 1600° C. is convenient. The rate of heating is not critical as it is in most such aluminum oxidation reactions and the firing can be completed in as little as 20 minutes starting with a cold unfired shape. The aluminum in the molding powder behaves as though it were in a passive form. The shaped objects are most conveniently fired in air but other atmospheres containing oxygen are satisfactory.

The molding powder can be used as a mortar for refractory bricks and fired to afford a strong bond. The molding powder can also be used to clad metals by compressing a layer of the powder onto the metal (such as hot rolled steel), which preferably has a rough surface, and then firing.

The fired products contain alpha alumina, some aluminum metal and possibly some of the metal from the metal oxide. Since zinc boils (B.P. 907° C.) below the firing temperature, the metal may be substantially completely removed from the final structure when zinc oxide is employed. Some metal may recombine and oxidize to form new components such as the spinel, $ZnAl_2O_4$.

The composition of the fired product can be altered by adding other substances in an amount of from 0.1 to 25% of the total which may act as a reactant in the firing process or as an inert filler refractory.

Oxides such as $Fe_2O_3$, $Cr_2O_3$, $MnO_2$, $CoO$ and $CdO$ which are not suitable for making the molding powder (the metal oxide-coated aluminum) may be added thereto and the mixture fired with adequate control to give a fired body containing a free metal (e.g., iron) as such or an alloy with aluminum.

Substances such as oxides of the metals from groups II-A and III-A which will not readily give the reduced metal can be added to the molding powder.

Sieves used are Tyler Standard Screen Scale Sieves. The expression "$a/b$ mesh" means that all particles pass in "$a$" mesh and are retained on "$b$" mesh. The expression "$-a$ mesh" means that such particles pass an "$a$" mesh sieve.

EXAMPLE I

Sixty-seven grams of aluminum (2.48-gram atoms) is melted in a graphite crucible in a furnace and heated to about 1000° C. A total of 72 grams of zinc oxide powder (0.90 mole) is added over a period of 2 minutes to the aluminum with stirring by hand using an alumina rod. Stirring and heating is continued for about 15 minutes until a temperature of about 980° C. is reached and fumes of zinc oxide are visible. The crucible is removed from the furnace and cooled. Sieving of a portion of the product gives the distribution: +48 mesh, 27%; 48/250 mesh, 51% and passing 250 mesh, 22%. X-ray analysis of the product shows Al, and a trace of alpha alumina.

A portion of the powder thus prepared is molded to a 2 x 0.25 x 0.25 inch bar under a pressure of 5000 pounds per square inch (p.s.i.). It is placed in an oven at 1100° C. and fired for 30 minutes. It is then refired in a pure oxygen atmosphere at 1150° C. for 30 minutes. The fired bar has a flexural strength of 1430 p.s.i. The product has the sharp edges and parallel sides of the mold. It is not warped. It has a fused, dense exterior shell 0.020 inch thick and a softer interior. The body is an excellent conductor of electricity. Leaching with concentrated hydrochloric acid increases the electrical resistance. It contains only alpha alumina and a trace of aluminum.

When the above molding powder is replaced with a mixture of powdered aluminum and zinc oxide corresponding to the initial feed above, the molded bar explodes when it is placed in an 1100° C. furnace.

EXAMPLE II

Fifty-four grams of pure aluminum (99.95%) is melted in a mullite crucible 3" I.D. x 3.5" high and heated to 900° C. in a furnace. The molten aluminum is stirred at 300 revolutions per minute by a simple T-bar stirrer of quartz coated with a zirconium phosphate refractory (a 2" bar on a 10" shaft) and zinc oxide (99% purity of $-325$ mesh) is rapidly added. Stirring is continued for about 10 minutes. During the addition of the oxide and the stirring the reactants change from a fluid state of oxide dispersed in liquid aluminum to a plastic state and finally to a powdered condition where the metal is completely dispersed in the oxide. Some reduction of the zinc oxide occurs as the final powdered state is approached at a temperature of about 950° C., as evidenced by the vaporization of metallic zinc. The crucible is removed from the furnace, covered to avoid nitride formation or further oxidation of aluminum and cooled.

The reaction product is removed from the crucible, sieved through a 16-mesh screen and weighed. Yields of 64-96% ($-16$ mesh) are obtained for items $a$-$e$. Sieving results (rounded to nearest whole number) for products from different reactant ratios (gram atomic weight of aluminum/moles of zinc oxide) are given in Table I as items $a$-$e$. Items $h$, $i$ and $j$ are made using magnesium oxide ($-325$ mesh of 97% purity) for comparative reasons. The results indicate that magnesium oxide is a poor dispersing oxide for aluminum since there is such a very high percentage of coarse material present in the reaction product.

A sample of item $a$ is mounted in plastic, polished and examined with a metallurgical microscope. It is seen to consist of aluminum particles containing occlusions of alumina and occasionally zinc oxide. The remainder of the zinc oxide is present in a layer on the surface of the aluminum particles. No other particles of zinc oxide are visible.

The molding powders $a$-$e$ afford strong, hard bars of alumina when molded and fired.

The numbers in parentheses in Table I are the percent of the total aluminum (free or combined) present in the coarser fractions (i.e., retained on a 30-mesh screen) of the total reaction product. These results indicate that the aluminum is well dispersed using ZnO or $TiO_2$. However, the magnesia has caused very little dispersion of the aluminum.

TABLE I

| Item | Oxide | Reactant Ratio Al/metal oxide | Cumulative percent retained on sieve | | | | |
|---|---|---|---|---|---|---|---|
| | | | 16 mesh | 30 mesh | 60 mesh | 120 mesh | 200 mesh |
| a | ZnO | 10.8 | 5 | 13 (11) | 47 | 70 | 99.0 |
| b | ZnO | 8.1 | 11 | 19 (17) | 26 | 60 | 84 |
| c | ZnO | 6.0 | 4 | 12 (3) | 32 | 70 | 100 |
| d | ZnO | 4.0 | 7 | 16 (2) | 43 | 70 | 99 |
| e | ZnO | 2.0 | 11 | 25 (6) | 47 | 69 | 100 |
| f | $TiO_2$ | 6.4 | 18 | 37 | 61 | 81 | 100 |
| g | $TiO_2$ | 2.0 | 1 | 22 (9) | 61 | 88 | 100 |
| h | MgO | 9.4 | 27 | 64 (70) | 89 | 97 | 100 |
| i | MgO | 7.0 | 8 | 54 (59) | 86 | 94 | 97 |
| j | MgO | 4.0 | 7 | 60 (75) | 85 | 92 | 95 |

The products are analyzed by X-ray diffraction methods using an internal standard and rotating the sample during the determination to average out differences due to uneven particle sizes in a fraction. The analysis by weight for each item is reported in Table II. Zinc oxide content is estimated by difference.

TABLE II.—ANALYSIS OF PRODUCTS

| Item | Al (percent) | $Al_2O_3$ | ZnO | $ZnAl_2O_4$ |
|---|---|---|---|---|
| a | 63 | None | 37 | None. |
| b | 60 | 16 | 24 | Do. |
| c | 59 | None | 41 | Do. |
| d | 46 | do | 54 | Do. |
| e | 26 | 5 | 45 | 24. |

EXAMPLE III

The procedure of Example II is repeated using titanium dioxide (99% pure, $-325$ mesh) as the metal oxide. Results are reported as items $f$ and $g$ in Table I.

EXAMPLE IV

The procedure of Example I is used to make a molding powder from 152 grams of an aluminum alloy (7.1% Cu. 0.9% Fc, 3.5% Si, 0.3% Mn, and 0.1% Zn) and 100 grams of powdered zinc oxide (4:1 ratio of gram atoms Al/moles of ZnO).

A bar is prepared from the 48/250 mesh fraction (i.e., is retained on a 250 mesh screen and passes through a 48-mesh screen) as in Example I. It has a bulk apparent density of 1.9 grams/cubic centimeter and a flexural strength of 5730 p.s.i.

Another portion of the molding powder is rolled by means of power driven mill to a sheet 10 x 5 x 0.0625 inch. The sheet is fired at 1200° C. in air for 30 minutes to give a hard, air impervious dark colored product of alpha alumina with an apparent density of 1.5 g./cm.$^3$ and a flexural strength of 4170 p.s.i. Further firing to 1500° C. in air yields a white product of similar properties.

What is claimed is:

1. A process for preparing an aluminum-containing-molding powder comprising combining aluminum and a finely divided metal oxide from the group consisting of zinc and titanium oxides, the ratio of gram atoms of aluminum to moles of the oxide being from about 11:1 to 1:1, and heating the mixture with agitation at a temperature of from 850° to 1100° C. until the mixture has the characteristics of a powder.

2. The process of claim 1 wherein the aluminum is in molten form and the metal oxide is between 100 and 325 mesh.

3. A molding powder composition comprising particulate aluminum having an oxide of the group consisting of zinc and titanium oxide bonded thereto, the ratio of gram atoms of aluminum to moles of the oxide being from about 11:1 to 1:1, and the aluminum being substantially uniformly dispersed throughout the composition.

4. The powder composition of claim 3 characterized by a particle size distribution wherein at least 60% passes a 30-mesh screen and at least 35% passes a 60-mesh screen.

References Cited by the Examiner

UNITED STATES PATENTS

| 2,527,723 | 10/1950 | Hansgirg | 95—67 |
| 2,793,949 | 12/1951 | Imich | 75—135 |
| 2,840,891 | 7/1958 | Hachtmann | 29—182.5 |
| 2,848,324 | 8/1958 | Krapt | 75—206 |
| 2,982,014 | 5/1961 | Hartwig | 29—182.5 |

FOREIGN PATENTS 587,595  4/1947  Great Britain.

OTHER REFERENCES

Cermets from Thermite Reactions—American Ceramic Society Journal, 42 (1959), pp. 40–49 by J. D. Walton Jr., and N. E. Poulos.

G. Venturello and V. Coen (Univ. Bologna) Met. Ital. 49, 621–5 (1957).

DAVID L. RECK, *Primary Examiner*.

W. W. STALLARD, *Assistant Examiner*.